Oct. 22, 1957     P. G. FANDEUX     2,810,534
AIRCRAFT AUXILIARY JET ENGINE NACELLE
Filed April 16, 1954
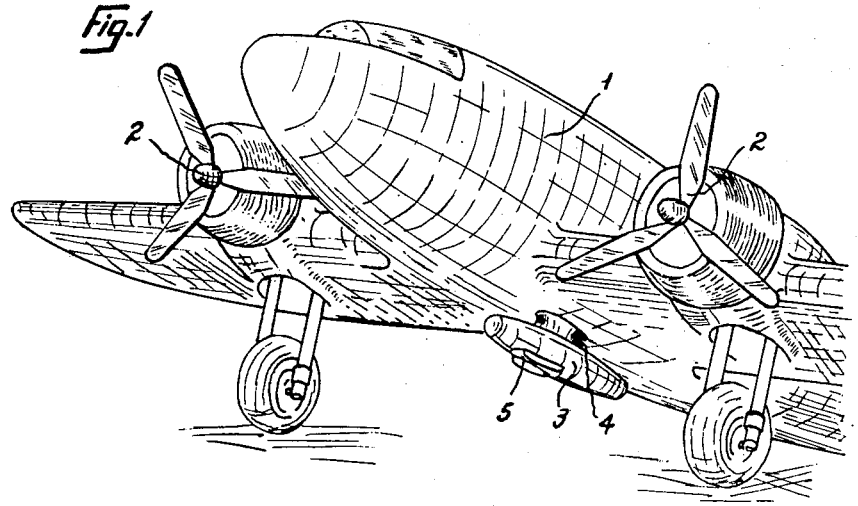
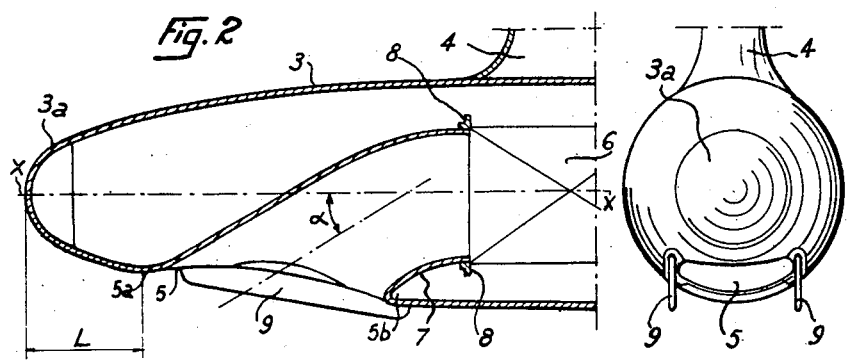
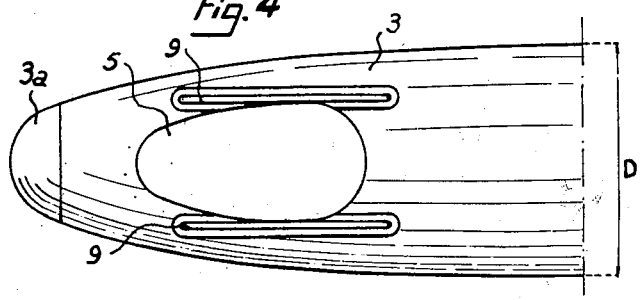
Inventor
Paul Gabriel Fandeux
by Brown & Newark
Attorneys

United States Patent Office 2,810,534
Patented Oct. 22, 1957

2,810,534

AIRCRAFT AUXILIARY JET ENGINE NACELLE

Paul Gabriel Fandeux, Courbevoie, France, assignor to Societe Nationale de Constructions Aeronautiques du Sud-Ouest (S. N. C. A. S. O.), Paris, France, a French company Application April 16, 1954, Serial No. 423,737

Claims priority, application France April 24, 1953

4 Claims. (Cl. 244—58)

This invention relates to auxiliary jet engines used as an aid or as a substitute for normal propelling means of an aircraft, i. e. provided for operating within short periods of time and at a comparatively low speed of the aircraft e. g. during take-off or in the case of a failure of said normal propelling means.

Auxiliary jet engines of this type are housed in a small streamlined nacelle under the fuselage of the aircraft. The air intake for feeding the jet engine is constituted by a pipe leading to the inlet of the compressor of the jet engine. Usually, the mouth of said pipe is located in the nose of the nacelle and faces directly the relative wind. The air conducting efficiency of such known air intakes is practically equal to unity, whatever may be the speed of the aircraft and both when the jet engine operates and when it is at rest. In the last condition, this efficiency is objectionable since the air rushing into the air intake causes autorotation of the compressor at a number of turns which increases with the speed of the aircraft, thus causing unwanted wear and undue increase of the drag. Moreover, when it rains, water is forced with air into the jet engine, which has obvious drawbacks. Similarly, the front position of the mouth of the intake facilitates introduction of extraneous bodies such as stones when the aircraft rolls on the ground. Briefly, it is obvious that a good air-conducting efficiency is required only when the auxiliary jet engine operates i. e. during comparatively short time periods, while in any other condition, air penetration is to be avoided.

Various devices have been proposed heretofore for closing the air-intake of the auxiliary jet engine nacelle when said engine is not in duty. Unfortunately, all these devices as well as the controls are complicated and expensive. Moreover, they increase unduly the weight of the nacelle and, last but not least, they give rise, or are subject, to icing phenomena, so that they must be provided with pre-heating facilities or other de-icing means.

This invention has for its purpose to overcome the above-mentioned drawbacks of the conventional air-intakes without resorting to any mechanical obturating means.

The main object of the invention is, therefore, to provide an auxiliary jet engine of the type described with an air intake having its mouth opening in the streamlined wall of the jet engine nacelle, at such a distance from its nose and having its edge, and in particular, the trailing portion of said edge, so shaped that the air-flow resulting from relative wind, instead of naturally tending to enter said mouth is projected further downstream along the streamlined outline of the nacelle.

Another object of the invention is to dispose the air intake opening upstream the maximum cross-section of the nacelle, so that it is located in a zone wherein the boundary layer has its maximum thinness.

With these arrangements, practically no air enters the intake when the jet engine is at rest, the boundary layer, acting in front of the intake mouth as a kind of obturating air sheet, as long as air is not deviated into the intake under suction due to operation of the jet engine.

This offers a number of advantages:

The practical absence of air circulation when the jet engine does not operate avoids any substantial autorotation of the compressor of said engine. The additional drag of the engine nacelle is reduced, as tests have shown, by about 25% as compared with that of a nacelle equipped with a front air intake, other things being equal. The ignition of the engine, when the aircraft is flying, takes place without any difficulty, even under violent rain. In spite of the aerodynamic quasiobturation of the air intake mouth, the air conducting efficiency of the air intake when the jet engine is in operation is sufficient at comparatively low speeds which are solely to be considered in this type of engine.

In order to improve still more said efficiency, a further object of the invention is to dispose, on either side of the air intake mouth, longitudinally extending panels, substantially right-angled to the plane of said mouth.

With panels of this type, having a length substantially equal to that of the air intake mouth and slightly shifted rearwardly with respect to the same, it has been found that the air conducting efficiency is kept at a value substantially equal to unity, up to a speed of about 140 miles per hour.

In spite of their capacity of increasing the air conducting efficiency when the jet engine is operating, the above mentioned longitudinal panels do not impair the main property of the air intake according to the invention i. e. that of allowing practically no natural introduction of air into the jet engine when the same is at rest.

A more particular object of the invention is to dispose the mouth of the air intake under the nacelle with its longitudinal axis in the mid vertical plane of the same.

This disposition has proved to be the best one for avoiding the penetration of water into the jet engine during rainy weather.

Other objects and advantages of the invention will be apparent from the following detailed description together with the accompanying drawings in which an embodiment of the invention has been shown as a mere illustration.

In these drawings:

Fig. 1 is a perspective view of an airplane equipped with an auxiliary jet engine having an air intake according to the invention.

Fig. 2 is a sectional view of the front half of the nacelle of the auxiliary jet engine showing the air intake according to the invention in longitudinal axial section.

Fig. 3 is a front view of said nacelle and,

Fig. 4 is an under plane view of the same.

In Fig. 1, the fuselage 1 of an airplane, normally propelled by two air-screw engines 2, carries under the lowest portion of its outer wall a streamlined nacelle 3 which is secured on said wall through a streamlined vertical mast 4 and which is provided with an air intake according to the invention, the mouth of which is generally shown in Fig. 1 at 5.

According to the invention, as shown in Figs. 2 to 4, the air intake 5 of the jet engine 6 has its leading edge 5a located at a distance L from the tip of the streamlined nose 3a of nacelle 3 at which distance the impact of the air on the profile of the nacelle takes place with an angle of incidence sufficiently small to cause the air threads to creep along said profile in a very thin layer, known as the boundary layer. Moreover, the trailing edge 5b of the intake mouth 5 is preferably rounded as shown in Fig. 2, so as to direct the air flow further downstream along the outer profile of the nacelle, while opposing its penetration into the air intake.

It has been found that for a ratio $$\frac{L}{D} \geq \frac{1}{2}$$

D being the diameter of the maximum cross-section of the nacelle, the air penetration into the air intake is negligible or at least insufficient to cause any considerable autorotation.

The air intake proper is consituted by a pipe 7 connecting the above described mouth 5 with the inlet of the compressor of the auxiliary jet engine 6. From the point of view of air conducting efficiency, the inclination $\alpha$ of the axis of the rectilinear portion of pipe 7, with respect to the longitudinal axis X—X of the nacelle should be made as small as possible.

On the other hand, it is obvious that the overall length of the nacelle depends upon the value of said angle, so that a suitable compromise is adopted in practice for each particular case. In a specific embodiment it has been found that an angle $\alpha$ of 30° corresponds to a reasonable length of the nacelle. The above mentioned rectilinear portion of pipe 7 is connected with the inlet of engine 6 through a suitably incurved portion, the latter being secured on engine 6 through any suitable means, as shown at 8. In the example shown, mouth 5 of the air intake is laterally straddled by a pair of parallel longitudinal panels 9 of comparatively small width arranged symmetrically on either side of mouth 5, slightly shifted rearwardly with respect thereto and having substantially the same length. In the example shown, mouth 5 is located under nacelle 3, so that panels 9 extend in substantially vertical planes, in the normal attitude of the airplane.

While the invention has been described wtih particular reference to preferred embodiments, it is not intended to limit the scope of the invention to said embodiments, nor otherwise than by the terms of the subjoined claims.

What I claim is:

1. In an airplane having a fuselage, an auxiliary streamlined jet engine nacelle having a transverse cross-section which varies in the fore and aft direction fixedly secured under said fuselage considered in the normal attitude of the airplane, an air intake including air conducting means to feed said jet engine with external air and a mouth for said air conducting means opening in the outer wall of said nacelle, the leading edge of said mouth being located at a distance from the tip of the nose of said nacelle at least equal to half the diameter of the maximum transverse cross-section of said nacelle, while the trailing edge of said mouth is located upstream said maximum transverse cross-section and presents a slightly rounded profile.

2. A streamlined engine nacelle according to claim 1, further provided with longitudinal panels extending on either side of said air intake mouth to canalize air flow and to improve the air conducting efficiency of said air intake under suction from said engine.

3. A streamlined engine nacelle according to claim 1, further provided with longitudinal panels extending on either side of said air intake mouth, having a length substantially equal to that of said mouth and slightly shifted rearwardly with respect to the same.

4. A streamlined engine nacelle according to claim 1, wherein, in the normal attitude of the airplane, said air intake mouth is located under said nacelle with its plane substantially right-angled with the main vertical plane of said nacelle.

References Cited in the file of this patent

UNITED STATES PATENTS

| | | |
|---|---|---|
| Re. 23,198 | Anxionnaz | Feb. 21, 1950 |
| 1,980,233 | Stout | Nov. 13, 1934 |
| 2,477,637 | Mercier | Aug. 2, 1949 |

FOREIGN PATENTS

| | | |
|---|---|---|
| 612,796 | Great Britain | Nov. 17, 1948 |
| 993,078 | France | July 18, 1951 |

OTHER REFERENCES

"Aviation" Issue of October, 1945; pp. 172, 173.